US006942124B2

(12) United States Patent
Dehn et al.

(10) Patent No.: US 6,942,124 B2
(45) Date of Patent: Sep. 13, 2005

(54) DRIP FEED APPARATUS FOR A FUEL CONTAINER

(75) Inventors: James J. Dehn, Brookfield, WI (US); Thomas G. Guntly, Hartford, WI (US); Peter D. Shears, Wauwatosa, WI (US); Bradley Deml, Campbellsport, WI (US); Marvin Klowak, Germantown, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 42 days.

(21) Appl. No.: 10/465,499

(22) Filed: Jun. 19, 2003

(65) Prior Publication Data

US 2004/0040619 A1 Mar. 4, 2004

Related U.S. Application Data

(63) Continuation-in-part of application No. 10/209,687, filed on Aug. 1, 2002.

(51) Int. Cl.$^7$ ................................................. B67D 5/00
(52) U.S. Cl. .................. 222/189.09; 222/187; 222/190; 141/100; 141/110; 141/364; 220/86.2; 123/1 A
(58) Field of Search ......................... 141/100, 110–112, 141/364, 375, 379; 220/86.2; 123/1 A; 222/187, 190, 189.09

(56) References Cited

U.S. PATENT DOCUMENTS

| | | | |
|---|---|---|---|
| 2,955,028 A | 10/1960 | Bevens | |
| 4,024,991 A | * 5/1977 | Tyson et al. | |
| 4,214,615 A | 7/1980 | Boyer | |
| 4,596,277 A | 6/1986 | Djordjevic | |
| 4,971,118 A | * 11/1990 | Cluff | 141/103 |
| 5,004,025 A | 4/1991 | Robbins | |
| 5,059,217 A | 10/1991 | Arroyo et al. | |
| 5,249,552 A | 10/1993 | Brooks | |
| 5,421,295 A | 6/1995 | Lemaire et al. | |
| 5,456,217 A | 10/1995 | Thunker et al. | |
| 5,573,557 A | 11/1996 | Thunker et al. | |
| 5,580,359 A | 12/1996 | Wright | |
| 5,662,799 A | 9/1997 | Hudgens et al. | |
| 5,695,531 A | 12/1997 | Makino et al. | |
| 5,735,320 A | 4/1998 | Tune et al. | |
| 5,992,473 A | 11/1999 | Hammonds | |
| 6,238,554 B1 | 5/2001 | Martin, Jr. et al. | |
| 6,263,924 B1 | * 7/2001 | Grosser | 141/102 |
| 2001/0000400 A1 | 4/2001 | Martin, Jr. et al. | |
| 2004/0026291 A1 | * 2/2004 | Drozd et al. | 206/524.7 |

FOREIGN PATENT DOCUMENTS

| | | |
|---|---|---|
| DE | 100 00 396 A | 7/2001 |
| JP | 07 224734 A | 8/1995 |

OTHER PUBLICATIONS

R.T. Vanderbilt Company, Inc., Vanlube PCX Specification sheet, Dec. 30, 1992 1 page.

R.T. Vanderbilt Co., Vanlube product information from web site, http://www.rtvanderbilt.com/petro_1.htm, printed Jul. 16, 2002.

Octel Starreon, LLC, DMA–H54 Material Safety Data Sheet, Revised Mar. 20, 2002, pp. 1–7.

Octel Starreon, LLC., Antioxidant No. 30 (AO–30) Material Safety Data Sheet, Revised Mar. 19, 2002, pp. 1–6.

Octel Starreon, LLC., DCI–6A Material Safety Data Sheet, revised Feb. 14, 2002, pp. 1–7.

(Continued)

Primary Examiner—J. Casimer Jacyna
(74) Attorney, Agent, or Firm—Michael Best & Friedrich, LLP

(57) ABSTRACT

The invention recites an apparatus that delivers a fuel additive to a fuel. The apparatus includes a housing that defines a fuel additive chamber. The housing has a release section that automatically releases a portion of the fuel additive from the chamber into the fuel.

69 Claims, 9 Drawing Sheets

OTHER PUBLICATIONS

Octel Starreon, LLC., DMD–2 Material Safety Data Sheet, revised Mar. 14, 2002, pp. 1–8.

Interface Solutions, Inc., Who We Are, web site http://www.sealinfo.com/isiweb/website.nsf/CompanyInfoView/Who+We+Are?Open Document, printed Jul. 5, 2002, pp. 1–4.

Interface Solutions, Inc., M–5201 Hydro–Fused/Nonasbetos Gasket Material, ASTMF723133E22M6 Specification Sheet, Revised Dec. 5, 2001, pp. 1–2.

Pall Corporation, "Did You Know? Hydrophobic Membranes Are Used in Automotive Applications", website http://domino.pall.com/www/weblib.nsf/868B55BC1B1827BA852564BA00497918/BC2 . . . , printed Apr. 24, 2003.

Pall Specialty Materials, Product specification sheet for Suppor® R Membrane, A FluoRepel™ Treated Membrane, and Appendix C—Basic Filtration Concepts, pp. 84–86, received Apr. 24, 2003.

* cited by examiner

US 6,942,124 B2

DRIP FEED APPARATUS FOR A FUEL CONTAINER

RELATED APPLICATION DATA

This is a continuation-in-part patent application of co-pending U.S. patent application Ser. No. 10/209,687 filed on Aug. 1, 2002, which is incorporated herein by reference.

BACKGROUND OF THE INVENTION

The present invention relates to fuel containers, and particularly to containers to which fuel additives are introduced.

Equipment employing an internal combustion engine, such as a lawnmower, includes a fuel system that supplies fuel to the engine. The system includes a tank, in which fuel is stored for use. Because the equipment is used intermittently, it is desirable to include a fuel additive in the fuel to protect the engine from damage. The additive may include a rust inhibitor, a de-moisturizer, a metal deactivator, an anti-oxidant, etc. Known additives include fuel stabilizers that are often mixed with the fuel in a storage container or added to the fuel tank before engine use.

Often fuel containers store large amounts of fuel for use in one or more pieces of equipment. These containers or tanks may hold fuel for long periods of time. During this time, contaminates (e.g., water, metals, dirt, etc.) can collect in the fuel. Therefore, it is desirable to add fuel additives to these tanks or containers.

Additives require precise mixing to reach their full effectiveness. Often this requires the user to mix the additive in a storage container or estimate the amount required in the fuel tank. These estimates result in inaccuracies in the mixture that can reduce the effectiveness of the additive or worse, can cause harm to the engine.

Furthermore, fuel degradation is known to be greatest when the fuel has been standing in a container after a period of inactivity. Therefore, an increase in the ratio of additive to fuel in the fuel container following a long idle period is desirable.

SUMMARY OF THE PREFERRED EMBODIMENT

The present invention provides an apparatus that delivers a fuel additive to a fuel. The apparatus includes a housing that defines a fuel additive chamber. The housing has a release section that automatically releases a portion of the fuel additive from the chamber into the fuel, without human intervention or mechanical operation.

In preferred constructions, the housing at least partially defines a fuel container cap. A second housing supports the first housing and completes the cap. In addition, the first housing includes an aperture and/or a membrane that meters the release of additive such that a predetermined volume is delivered at a predetermined rate.

In another preferred construction, the housing itself defines a cap for a container or a gas tank. The housing includes a chamber and a delivery portion for delivering additive to the interior of the tank or container.

The housing, in preferred constructions, covers the fill opening of the container or tank. In other constructions, a separate opening supports the housing.

In another construction, the apparatus provides a cap that delivers a fuel additive to a fuel container. The cap includes a first housing that defines a fuel additive chamber. The housing has a release section that automatically releases a portion of the fuel additive from the chamber. The cap also includes a second housing selectively engagable with the container. The second housing supports the first housing to position the release portion of the first housing in fluid communication with the container to allow the portion of fuel additive released from the chamber to enter the fuel container.

In preferred constructions, the cap covers the opening in the container that is used to fill or empty the container. In other constructions, a separate opening within the container supports the cap.

In another constructions, the invention provides a cap for a fuel container including a fuel additive and a first housing defining a fuel additive chamber. The fuel additive is contained within the fuel additive chamber. The housing also includes a vent section and a release section. A protective layer covers the vent section and establishes a substantially air-tight seal. A second housing is adapted to support the first housing in a dispensing position. The second housing includes a pierce point positioned to penetrate the protective layer and break the air-tight seal when the first housing is supported in the dispensing position.

In yet another construction, the invention provides a fuel additive dispenser including a housing having a chamber, a delivery portion, and a vent opening. A first membrane having a first wetting-resistant layer covers the vent opening and is oriented such that the first wetting-resistant layer is adjacent the fuel additive chamber. A second membrane having a second wetting-resistant layer covers the first membrane and is oriented such that the second wetting-resistant layer faces away from the first membrane.

BRIEF DESCRIPTION OF THE DRAWINGS

The detailed description particularly refers to the accompanying figures in which.

DETAILED DESCRIPTION OF THE DRAWINGS

Figure 1:
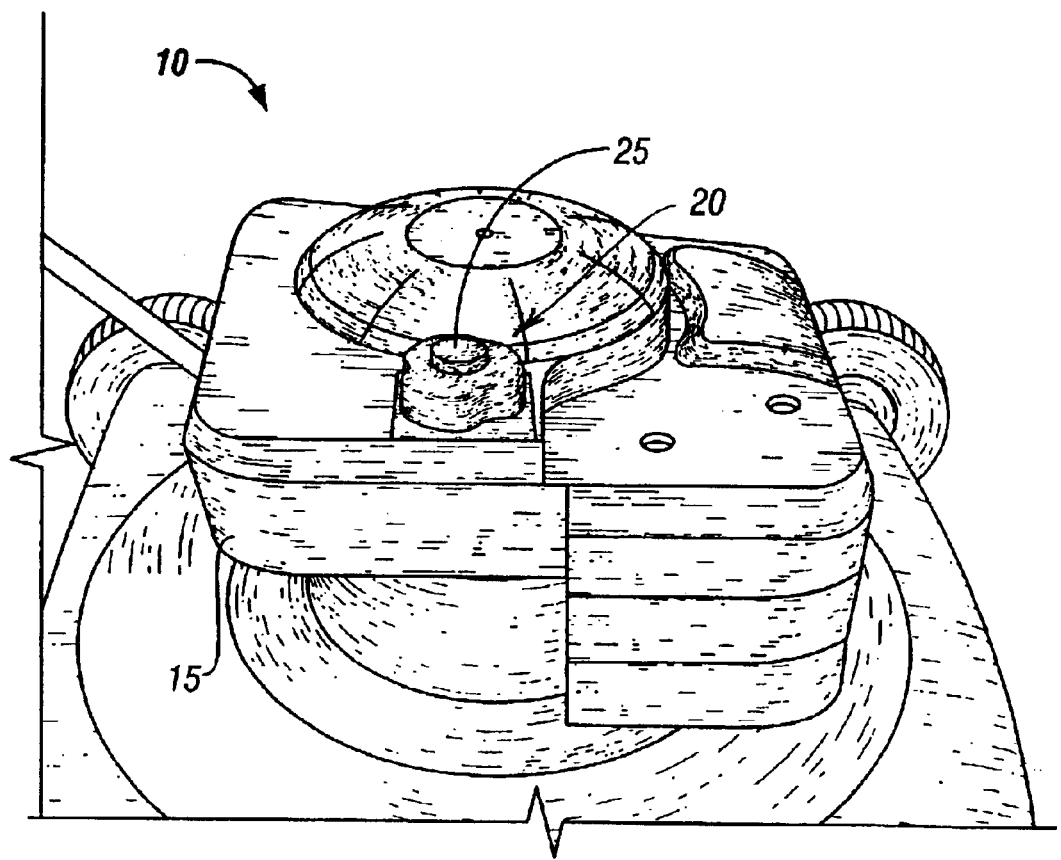
FIG. 1 is a perspective view of a portion of a lawnmower including a cap embodying the invention.

With reference to FIG. 1, a lawnmower 10 includes an engine having a fuel tank 15 and a cap 20. Included in the cap 20 is a drip feed apparatus 25 of the invention. While the invention is illustrated attached to a lawnmower engine, it should be understood that the invention will function with other internal combustion or diesel engines to provide an additive to the fuel. In addition, the invention will function with other types of fuel containers such as free-standing fuel tanks used in agriculture or construction to re-fuel equipment and portable fuel containers. Therefore, the invention should not be limited to lawnmower engines alone, nor should it be limited to engines having fuel tanks.

Figure 2:
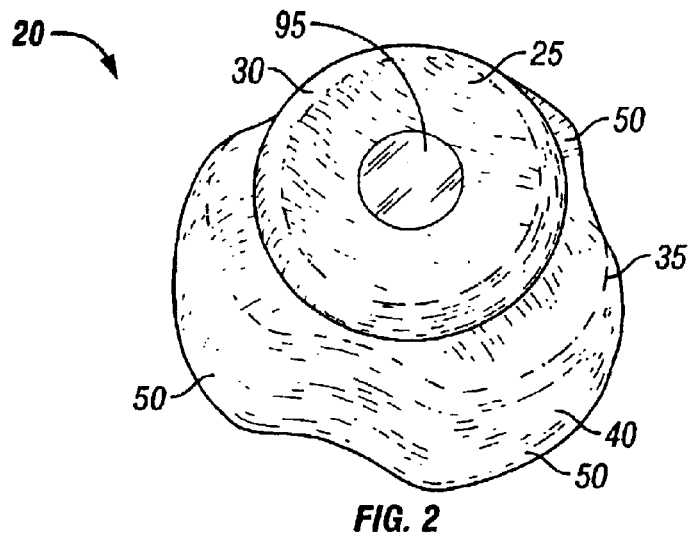
FIG. 2 is a perspective view of the cap shown in FIG. 1.
Figure 3:
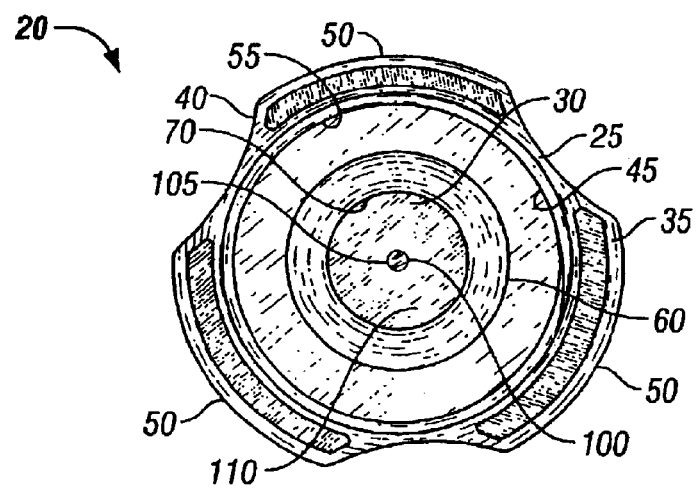
FIG. 3 is a bottom view of the cap shown in FIG. 1.
Figure 4:
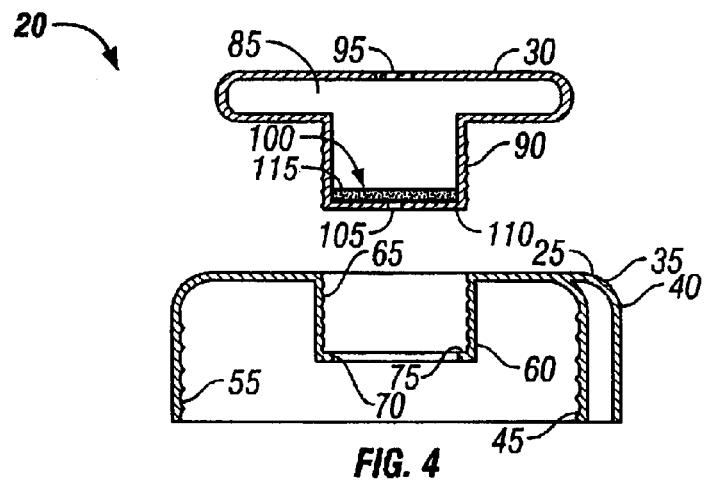
FIG. 4 is an exploded cross-sectional view of the cap of FIG. 1.

Turning to FIGS. 2–4, a construction of the fuel cap 20 includes a first housing such as a reservoir 30 and a second housing such as a cap shell 35. The cap shell 35 includes an outer surface 40 and an inner surface 45. The shape of the outer surface 40 of the cap shell defines a grip for the user. In the construction of FIGS. 2–4, the grip includes three lobes 50. However, other shapes will also function to define a grip for the user. For example, a four-lobed cap shell or vertical ribs provide satisfactory grips for the user and is contemplated by the invention.

The cap shell 35 further includes a first threaded portion 55 and a receptacle 60 for receiving the reservoir 30. The first threaded portion 55 provides a suitable engagement between the cap shell 35 and the opening of the fuel tank 15 or container to which it attaches. Other attachment methods (e.g., snap-fittings, cam-locks, etc.) will function with the invention.

The receptacle 60 projects toward the inner surface 45 of the shell 35 away from the outer surface 40 and includes a second threaded portion 65, an aperture 70, and a shoulder 75. The second threaded portion 65 includes threads that are sized to engage the reservoir 30. The large aperture 70 extends through the cap shell 35 and defines an opening between the exterior of the container and the interior of the container to which the shell 35 attaches. The shoulder 80 located adjacent the aperture 70 provides a stop for the reservoir 30 and allows the reservoir 30 to be fully inserted into the cap shell 35.

The reservoir 30, shown in section in FIG. 4, defines a chamber 85 in which a fuel additive can be stored for use. The reservoir 30 also includes a threaded portion 90, a window portion 95, and a release section 100.

The threaded portion 90 of the reservoir 30 is engagable with the second threaded portion 65 of the cap shell 35. When in the engaged position, the reservoir 30 closes the aperture opening between the container exterior and the container interior, thus defining a container cap 20. In the construction of FIGS. 2–4, the reservoir 30 in combination with the cap shell 35 defines a cap 20 capable of sealing a container or fuel tank 15.

The release section 100 includes an aperture 105, illustrated in the bottom surface 110 of the reservoir 30 in FIG. 4, that provides for a flow path out of the reservoir 30. It should be noted that some constructions do not include an aperture 105 but instead employ a reservoir 30 having a bottom surface 110 made of a permeable material (discussed below). The aperture size at least partially determines the rate at which additive is added to the fuel. For example, an aperture 105 may be sized to provide only one drop of fuel in a twenty-four hour period, while a larger aperture 105 may provide three drops. A smaller aperture 105 may provide only one drop of additive per week. The rate of flow is based on many variables (e.g., additive composition, fuel type, tank size, etc.) and should be determined individually for the desired application. It should be noted that the time period for delivery need not be precise. For example, a release section 100 that provides one drop of additive per day may actually deliver one drop on one day, no drops the second day, and two drops the third day. While the flow rate is given as one drop per day, it should be measured and averaged over a longer time period, perhaps a week (i.e., 7 drops in one week) or even a month (i.e., 30 drops in one month) to determine the actual flow rate.

To further control the flow rate out of the reservoir 30, the release section 100 of FIG. 4 includes a membrane 115 disposed within the reservoir 30. The membrane 115 is disposed between the fuel and the fuel additive so that the additive must pass through the membrane 115 to get to the fuel. The membrane 115 provides a permeable layer that allows the additive to pass at a predictable rate (e.g., 0.01–0.02 grams/day).

In addition to being permeable, the membrane 115 is preferably also resistive to gasoline vapor or any fuel vapor that it may be exposed. Furthermore, it is desirable that the membrane 115 have a low swell rate that can be bonded directly to the reservoir 30. Higher swell rate materials will function with the invention but may have a tendency to de-bond from the reservoir 30 or component to which they are attached.

The membrane 115 swells when it is exposed to fuel vapor. The swelling allows the membrane to begin dispensing fuel additive (i.e., activates the membrane 115). If the membrane 115 is not exposed to fuel vapor it will not dispense additive or will dispense additive at a substantially slower rate. Thus, the membrane prevents or reduces waste by preventing or significantly reducing the dispensing of fuel additive into an empty container.

Other membranes dispense fuel at a substantially constant rate regardless of the presence or absence of fuel vapor. No matter the membrane used, it should automatically dispense additive.

The term "automatically" as used herein should be read to include release sections that release fuel additive independent of any user action. For example, as just described, the release section requires only the presence of fuel or fuel vapors to dispense additive. No other action by the user is required. On the other hand, an additive dispenser that dispenses additive only when fuel is flowing into a tank or flowing through a particular component would not be considered "automatic" as that term is used herein.

A suitable membrane material would be a hydro-fused/non-asbestos gasket material such as ASTM-F723133E22M6 manufactured and sold by Interface Solutions, Inc. of Lancaster Pa. and sold as the N8092 gasket. Other constructions use other materials such as cork, or fibrous paper-type gasket materials. The membrane is approximately one-sixty-fourth of an inch thick with thinner and thicker membranes possible.

The material used for the membrane, the thickness of the membrane, and the surface area of the membrane are all variables that combine to determine the rate of flow through the membrane. Therefore, great variation in these properties is contemplated by the present invention depending on the specific application.

In the constructions illustrated in FIGS. 2–7 the membrane 115 is disposed within the reservoir 30 such that the additive must first pass through the membrane 115 to reach the aperture 105. In another construction, the membrane 115 is disposed outside of the reservoir 30. In this construction, the additive passes through the aperture 105 and is absorbed by the membrane 115. The membrane 115 then delivers the additive to the fuel tank 15 or container.

In yet another construction, the membrane 115 forms the bottom surface of the reservoir 110. In this construction, the membrane 115 alone separates the additive from the fuel and determines the rate of flow of additive to the fuel tank 15 or container.

Figure 12:
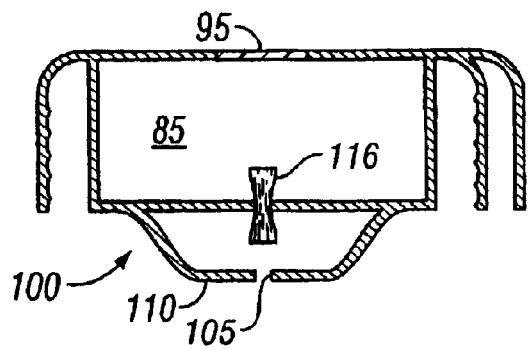
FIG. 12 is a cross-sectional view of an alternate construction of the release section of a drip feed apparatus.
Figure 13:
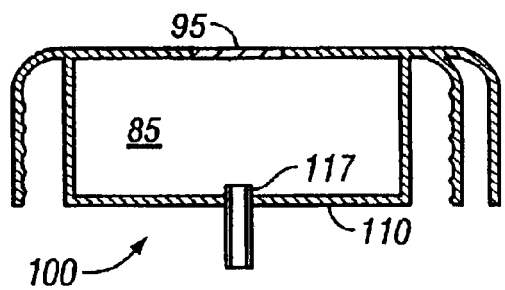
FIG. 13 is a cross-sectional view of another alternate construction of the release section of a drip feed apparatus.

Another construction of the release section 100, illustrated in FIG. 12, includes a wick 116 that extends into the chamber 85 rather than a membrane 115. The wick 116 utilizes capillary action in a known manner to deliver additive or additive dissolved in fuel from the chamber 85 to the fuel container or tank 15. While FIG. 12 illustrates a flexible wick 116, a capillary tube 117, as illustrated in FIG. 13, would also function to deliver additive to the tank 15 or container.

Figure 14:
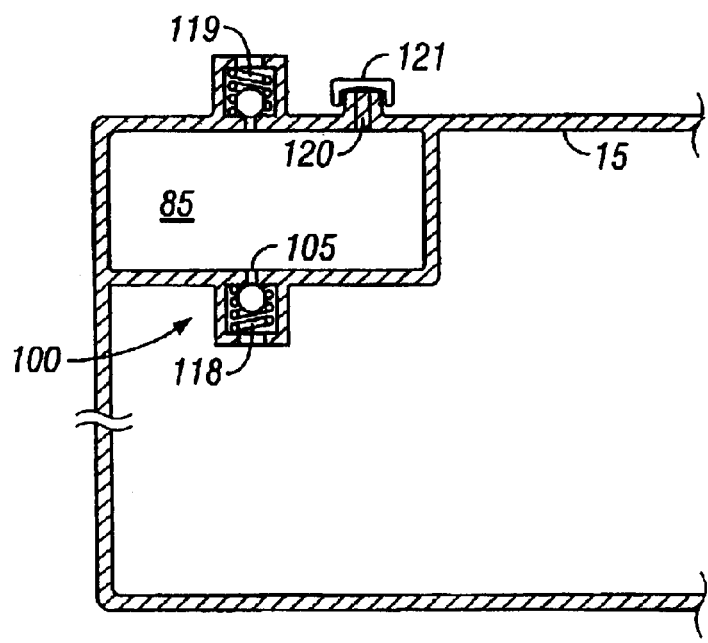
FIG. 14 is a cross-sectional view of an alternate construction of a drip feed apparatus.

In still another construction, illustrated in FIG. 14, the release section includes a check valve 118 that opens to deliver additive to the tank 15 or container. In this construction, the fuel tank 15 is vented to prevent pressurization or maintain the tank 15 at a pressure slightly above atmospheric pressure. The diurnal pressure fluctuations and temperature fluctuations of the atmosphere act to increase the pressure within the chamber 85, which is sealed. When the pressure reaches a predetermined differential (chamber pressure minus fuel tank pressure), the check valve 118 opens and additive is dispensed. The release of additive equalizes the pressure between the fuel tank 15 and the chamber 85, thereby allowing the check valve 118 to close. Because the diurnal effect is greatest during the hot summer months, a greater quantity of additive will be delivered during this period of time. In addition, a second check valve 119 may be used to deliver air to the chamber 85 to aid in equalizing the chamber pressure. Also illustrated in FIG. 14 is a fill hole 120 and cap 121 that allows for the refill of the chamber 85.

FIG. 2 best illustrates the window portion 95 of the reservoir 30. The window portion 95 is a clear portion that allows for the visual inspection of the chamber 85 within the reservoir 30. Thus, a user can visually determine whether fuel additive is present within the reservoir 30. In another construction, a portion of the sidewall of the reservoir 30 is transparent to allow the visual determination of the quantity of fuel additive within the reservoir 30.

Figure 5:
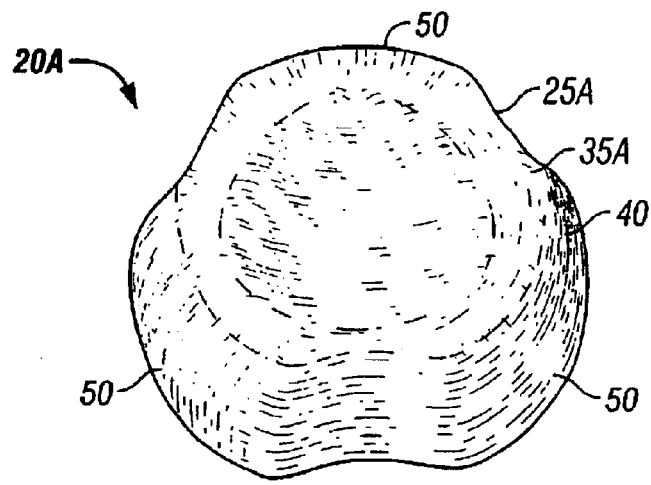
FIG. 5 is a first alternate construction of a cap embodying the invention.
Figure 6:
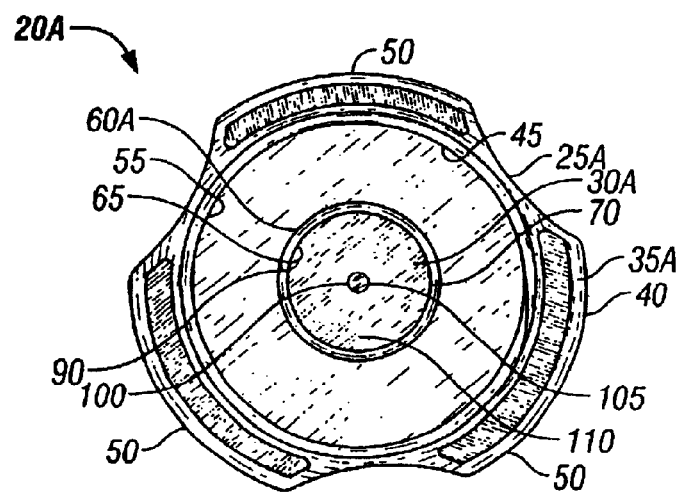
FIG. 6 is a bottom view of the cap shown in FIG. 5.
Figure 7:
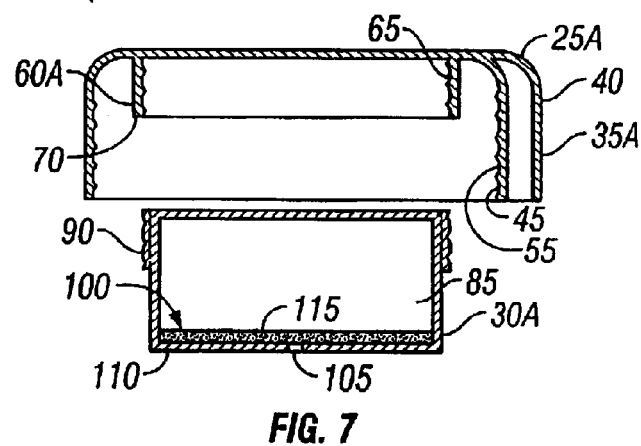
FIG. 7 is an exploded cross-sectional view of the cap of FIG. 5.

FIGS. 5–7 illustrate another construction of the cap 20A in which the cap shell 35A, or second housing, provides a sealing cover for the tank 15 or container opening. A receptacle 60A is disposed on the inside surface 45 of the cap shell 35A to support the reservoir 30A or first housing. The reservoir 30A in the construction of FIGS. 5–7 would not be visible to the user when the cap 20A is connected to the tank 15 or container.

The reservoir 30A, like the reservoir 30 of FIGS. 2–4, defines a fuel additive chamber 85. In preferred constructions, the fuel additive chamber 85 is large enough to hold about 8 ml of fluid with larger or smaller-reservoirs possible depending on the application. For example, a chain saw may require a reservoir that only holds 4 ml of additive. On the other hand, a large fuel storage tank may require a reservoir as large as 1000 ml.

Figure 8:
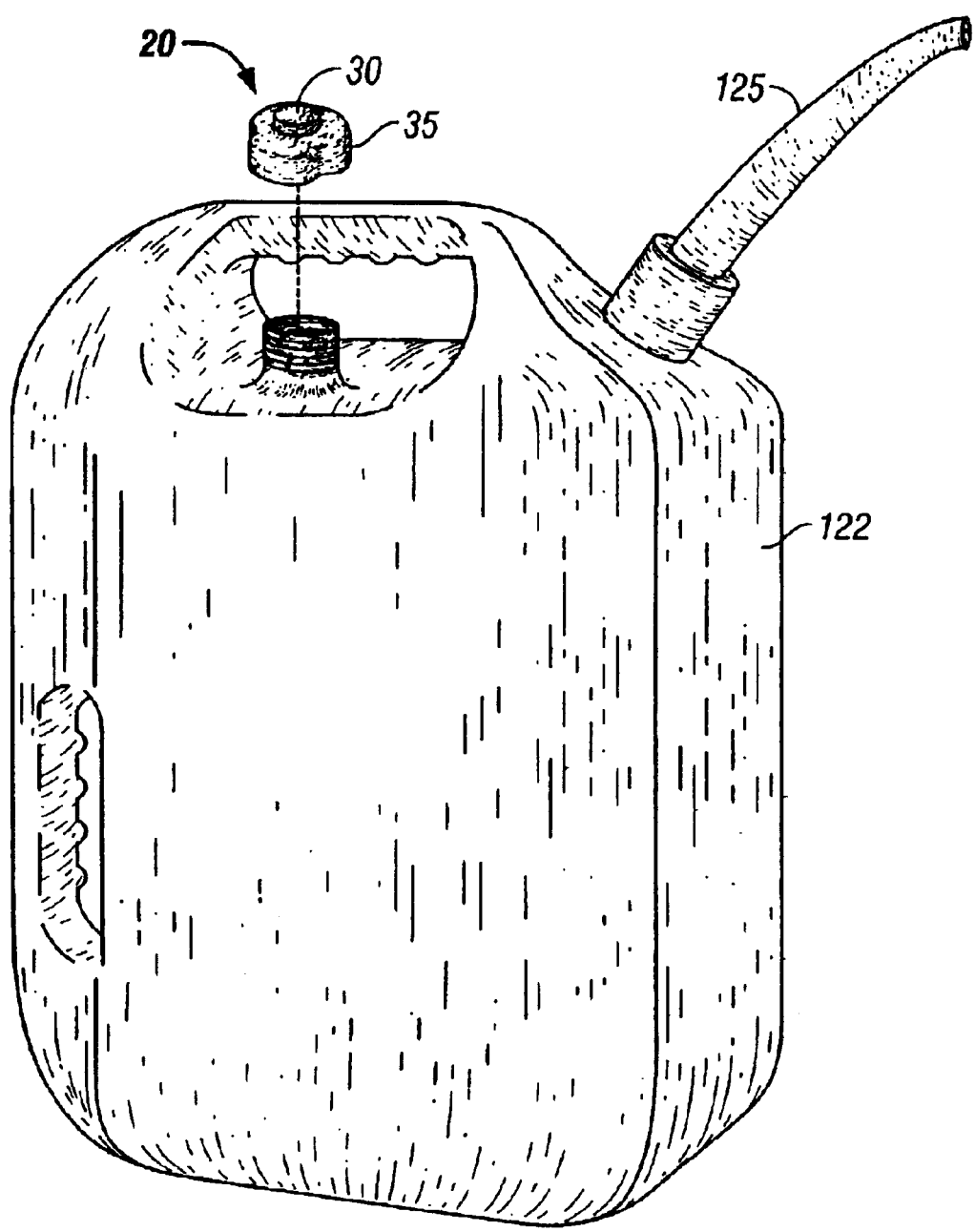
FIG. 8 is a partially exploded perspective view of a fuel container including the cap of FIG. 2.

FIG. 8 illustrates a fuel container 120 including a dispensing spout 125 and a cap 20 similar to the cap of FIGS. 1–4. The dispensing spout 125 covers a first opening through which fuel is added and removed. The cap 20 covers a second opening in the container 120. Thus, the cap 20 can be attached to the container 120 and only needs to be removed for replacement. Other cap designs, such as those illustrated in FIGS. 5–7 or in FIGS. 9–13 would also function as caps for the container 120 illustrated in FIG. 8.

In other constructions, the reservoir attaches to the inside of the container and is not visible from the outside. A receptacle within the tank or container receives the reservoir such that the container requires only one opening for filling the container and dispensing the fuel.

In still other constructions, the reservoir is formed as part of the container, as illustrated in FIG. 14. The reservoir within the container contains sufficient additive for a period of time (e.g., five years). When the additive runs out, the container is replaced or the reservoir is refilled.

Figure 9:
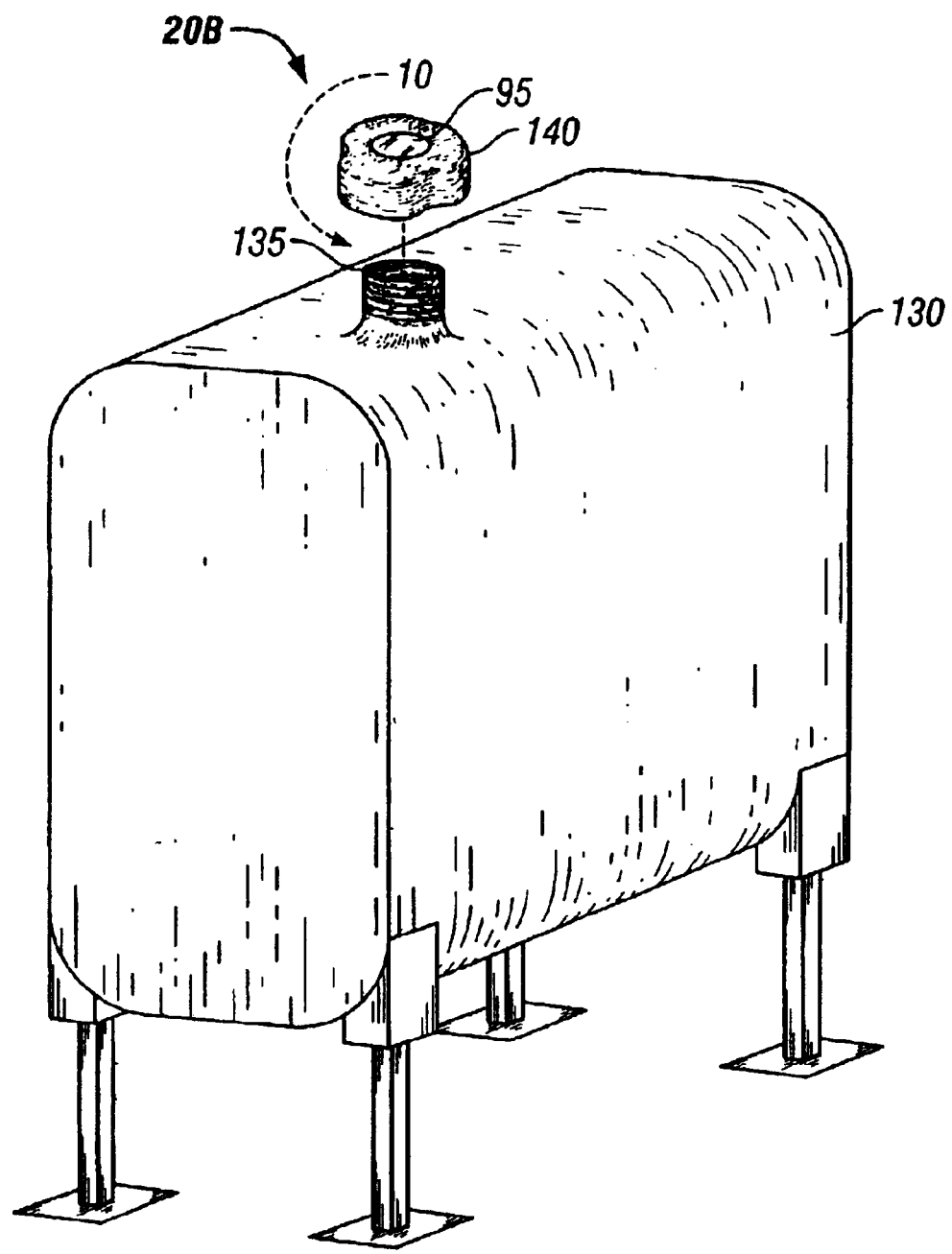
FIG. 9 is a perspective view of a fuel storage container and an alternate construction of the cap.

FIG. 9 illustrates a storage tank 130 commonly used on farms, construction sites, or other locations at which high quantities of fuel are used. A cap 20B is illustrated as covering an opening 135 in the tank 130. The cap 20B and opening 135 of FIG. 9 are exaggerated to better illustrate their location and design. Generally, these tanks 130 store dozens, or hundreds of gallons of fuel and as such are very large when compared to the fuel cap 20B.

Figure 10:
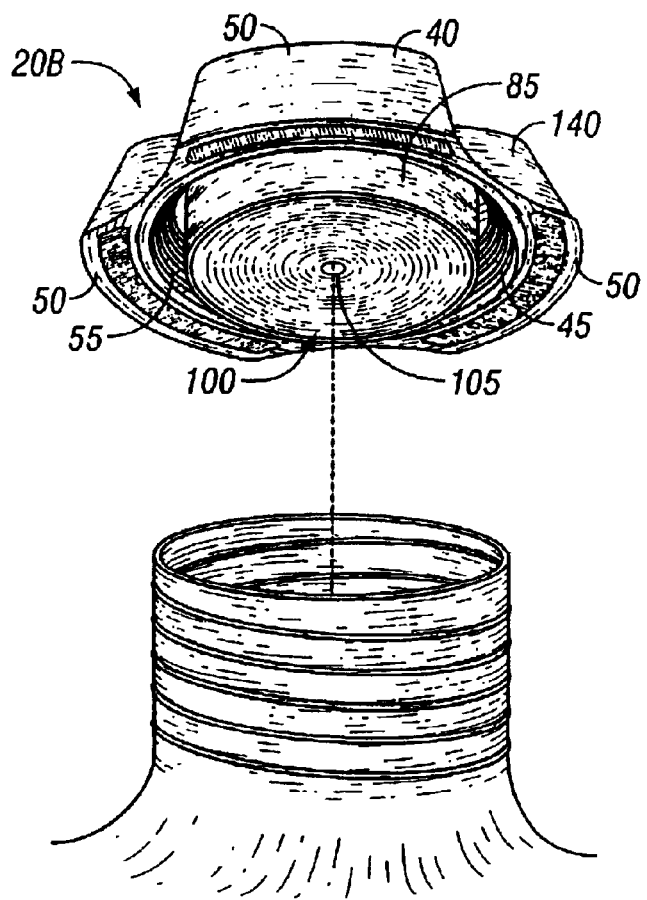
FIG. 10 is a partial perspective view of the fuel storage container of FIG. 9 including the cap of FIG. 9.

FIG. 10 better illustrates the interior of the cap 20B of FIG. 9. The cap 20B is formed from a single housing 140 that includes the reservoir and cap shell rather than the two piece cap 20A, 20B illustrated in FIGS. 1–7. Like previous constructions, the housing 140 defines the chamber 85, and includes a release section 100. The release section 100 includes an aperture 105 and a membrane 115 configured to dispense the additive at the desired rate.

Figure 11:
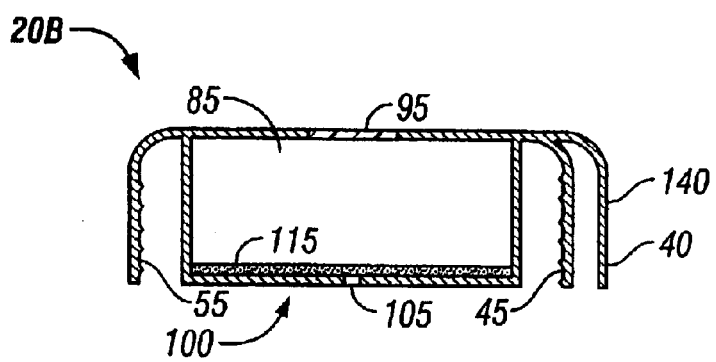
FIG. 11 is a cross-sectional view of the cap of FIG. 9.

The single piece cap 20B allows for a larger chamber 85, best illustrated in FIG. 11, than can be achieved using the two-piece construction. The larger chamber 85 allows the cap 20B to provide additive for a longer period of time, or alternatively allows for a faster drip rate. The faster drip rate may be necessary for the large volume of fuel commonly held in these large storage tanks 130.

Figure 15:
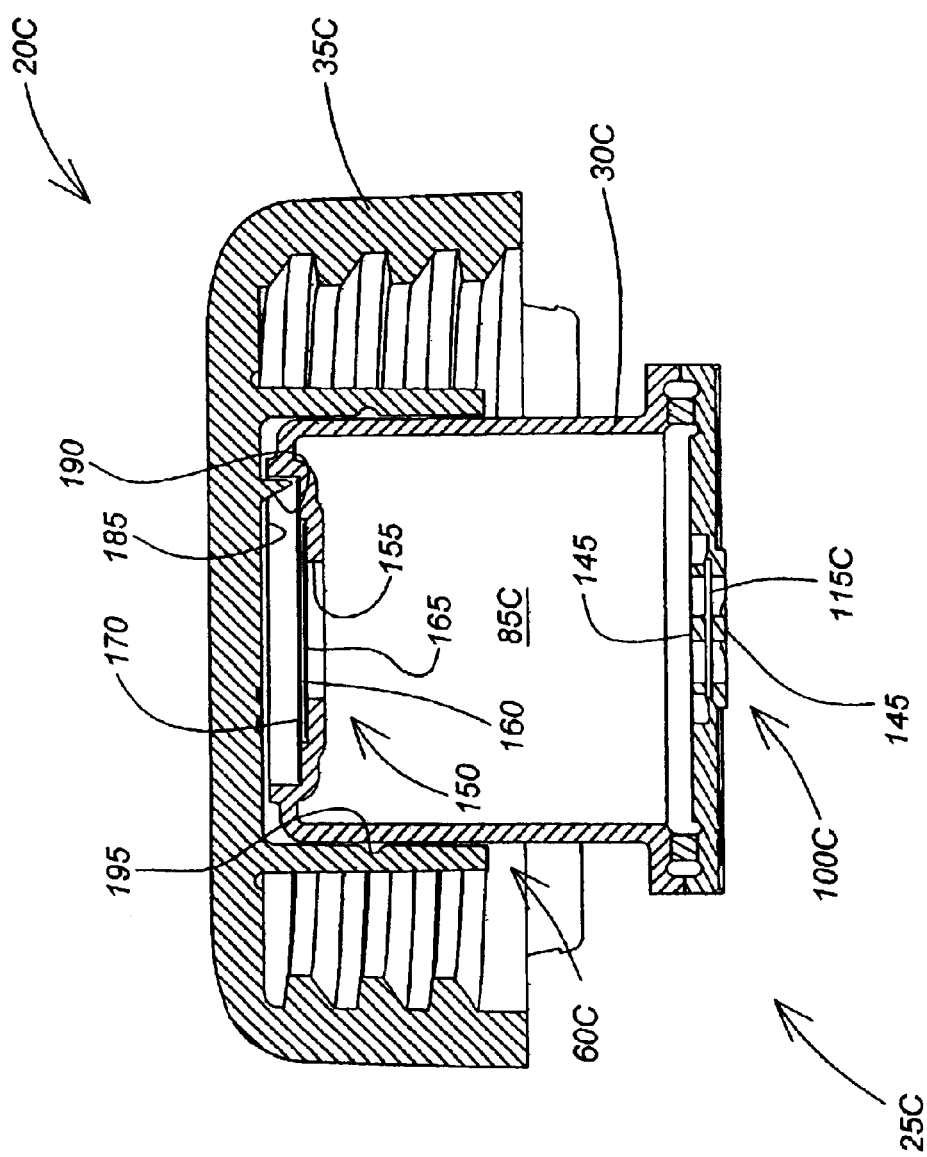
FIG. 15 is a cross-sectional view of an alternate construction of a drip feed apparatus including a vent section.
Figure 16:
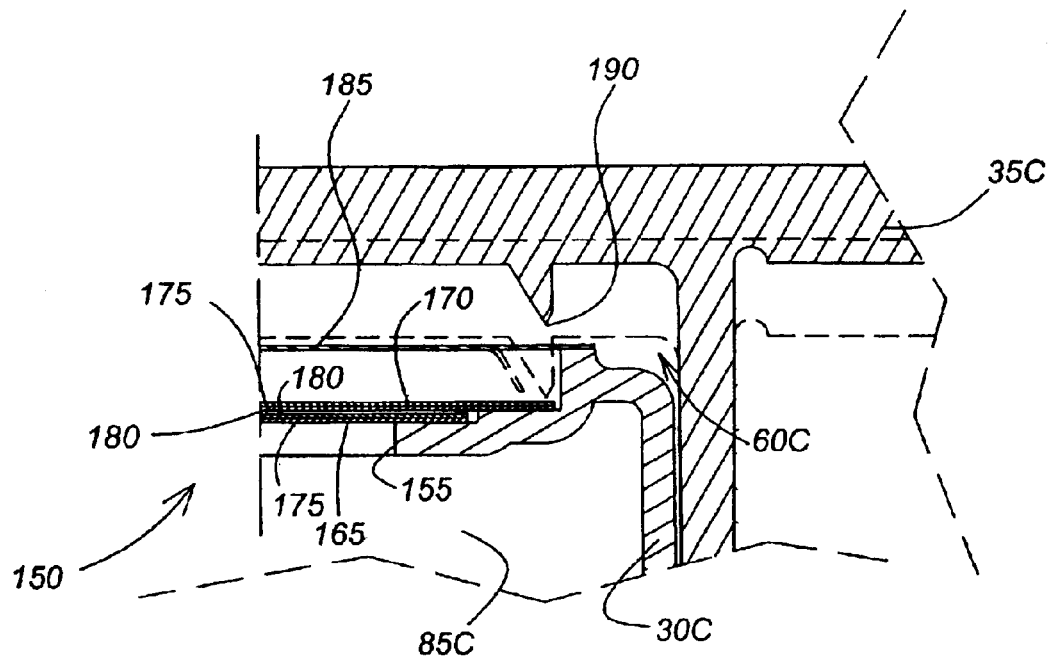
FIG. 16 is an enlarged cross-sectional view of the vent section of FIG. 15 including a pierce point.
Figure 17:
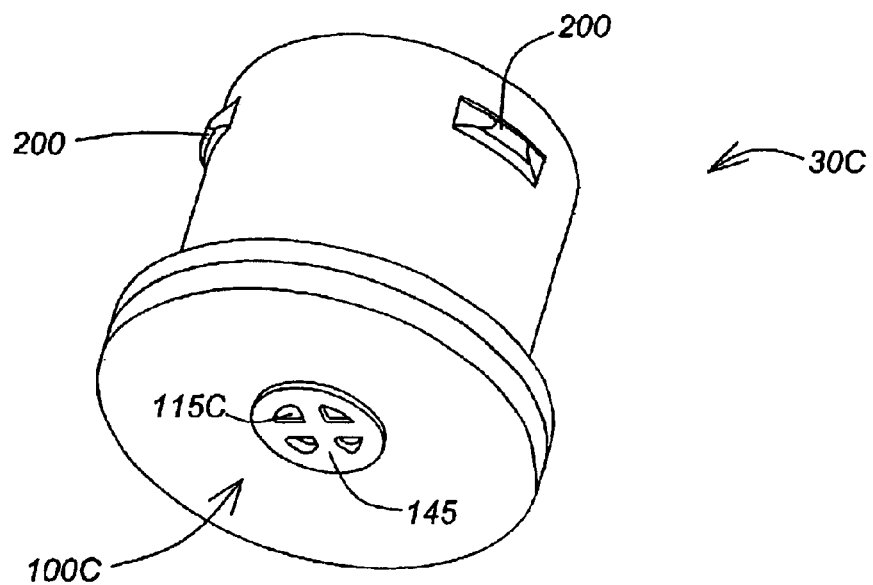
FIG. 17 is a perspective view of the reservoir of FIG. 15.

FIGS. 15–17 illustrate another construction of a cap 20C including a drip feed apparatus 25C. With reference to FIG. 15, the cap 25C includes a reservoir 30C and a cap shell 35C. As with the previous constructions, the reservoir 30C defines a chamber 85C sized to hold a desired volume of fuel additive. The reservoir 30C also includes a release section 100C that includes a membrane 115C similar to that described with regard to previous constructions.

The membrane 115C covers an aperture 105C positioned in the bottom surface of the reservoir 30C. A cross-hair arrangement 145, illustrated in FIG. 17 provides additional support for the membrane 115C and prevents the membrane 115C from passing through the aperture 105C. The cross-hair arrangement 145 can be formed as part of the reservoir 30C or can be added to the reservoir 30C during an assembly process. In addition, the cross-hair arrangement 145 may include a support structure on the top surface of the membrane 115C as well as the bottom surface, as illustrated in FIG. 15. The use of the cross-hair arrangement 145 allows for the use of a larger aperture 105C. The larger aperture 105C may be necessary in some designs to achieve the desired drip rate.

A removable layer covers the membrane 115 to protect the membrane 115 during shipment or storage and to prevent unwanted leakage of fuel additive. The removable layer includes a sticky layer that adheres to the surface of the reservoir 30 cover the membrane. To begin dispensing the additive, the user must first peel off the removable layer. Many methods may be used to attach the removable layer to the reservoir 30 (e.g., glue, adhesive, magnets, static cling and the like).

With continued reference to FIG. 15, the reservoir 30C includes a vent section 150 positioned in the top surface of the reservoir 30C. The vent section 30C includes a vent opening 155 covered by a semi-permeable membrane 160. The vent opening 155 includes one or more apertures formed in the reservoir 30C. The vent opening 155 provides fluid communication between the atmosphere outside of the chamber 85C and the chamber 85C defined within the reservoir 30C. The membrane 160 covers the vent opening 155 to inhibit the flow of unwanted substances (e.g., fuel, water, fuel additive, dirt, lawn clippings and the like) into or out of the reservoir 30C.

FIG. 16 illustrates one possible membrane 160 in detail. The membrane 160 includes two thin layers of material. The first or inner layer 165 attaches to the reservoir 30C and covers the vent opening 155. The second or outer layer 170 is spaced a small distance from, and covers the inner layer 165. An adhesive or other attachment means fixedly attaches each layer 165, 170 to the reservoir 30C.

Each of the upper and lower layers 165, 170 includes a wetting-resistant material 175 attached to a support surface 180. Each layer 165, 170 is typically between 3.8 and 8.0 mils thick, with thinner or thicker layers being possible. To provide the desired wetting-resistance, the inner layer 165 is arranged with the wetting-resistant material 175 facing into the reservoir 30C. This has the desired effect of inhibiting the passage of fuel additive through the vent section 150. Any fuel additive that splashes, or otherwise contacts the inner layer 165 quickly drips off without wetting the inner layer 165. The outer layer 170 is positioned above the inner layer 165 and is oriented with the wetting-resistant material 175 facing away from the reservoir 30C. Thus, any moisture or fuel that may collect on top of the reservoir 30C will not wet the layer 170 and will be inhibited from passing through the outer layer 170. Air on the other hand, passes substantially freely through both the upper and lower layers 165, 170 to allow the vent section 150 to equalize pressure between the fuel tank or container to which the cap 20C is attached and the chamber 85C within the reservoir 30C.

Preferably the inner and outer layers 165, 170 are highly oleophobic (resistant to hydrocarbon-based substances) and/or hydrophobic (resistant to water-based substances). The layers 165, 170 each include a modified polyethersulfone polymer cast on a non-woven polyester support. One material well suited to this application is Supor 450 R Membrane (FluoRepel treated) as manufactured by Pall Specialty Materials located at 25 Harbor Park Drive, Port Washington, N.Y. 11050.

It should be noted that while a two-layer membrane 160 has been described, other constructions may include a single layer membrane 160, or a membrane 160 made up of more than two layers. As such, the membrane 160 should not be limited to the example just described.

A protective layer or layer 185, illustrated in FIG. 16, covers the vent section 150 and protects the membrane 160 from damage that is sometimes caused during shipment or storage of the reservoir 30C. The protective layer 185 attaches to the top of the reservoir 30C and provides a substantially air tight seal. The layer 185 preferably includes an aluminum foil that attaches to the reservoir 30C using an adhesive. Other materials such as plastic could be used for the protective layer 185.

In order for the vent section 150 to function as desired, the protective layer 185 must be removed or punctured. To facilitate the accurate puncturing of the layer 185 without damaging the membrane 160, the present construction includes a pierce point 190 formed as part of the cap shell 35C. As the reservoir 30C is inserted into the cap shell 35C, the pierce point 190 contacts and pierces the layer 185 (as shown in broken lines in FIG. 16). With the reservoir 30C in its final operating position, the pierce point 190 rests just above the membrane 160, thus making it difficult for the pierce point 190 to damage the membrane 160 during the installation process. To further reduce the likelihood of damage, the pierce point 190 is positioned on a diameter well outside of the vent opening 155. As such, if the pierce point 190 did contact the membrane 160, the contact would occur in the region where the membrane 160 attaches to the reservoir 30C and would likely have no detrimental affect on the performance of the vent section 150.

It should be noted that other constructions include a pierce point that is inserted into or through the cap shell 35C after the reservoir 30C and the cap shell 35C are attached to one another. Still other constructions use pierce points that attach to the cap shell 35C instead of being formed as part of the cap shell 35C. As such, the invention should not be limited to pierce points that are formed as part of the cap shell 35C.

Simply piercing the protective layer 185 provides sufficient air flow for the vent section 150 to function properly. However, it is possible to use the pierce point 190 as a knife to remove a substantial portion of the protective layer 185 from the reservoir 30C. After the pierce point 190 pierces the protective layer 185, rotation of the reservoir 30C will sever the protective layer 185 along a circle having a radius approximately equal to the radial position of the pierce point 190. For constructions that use threaded connections between the reservoir 30C and the cap shell 25C, continued rotation of the reservoir 30C during installation will completely sever a large portion of the protective layer 185 from the reservoir 30C.

With reference to FIGS. 15 and 17, a tab and slot attachment arrangement between the reservoir 30C and the cap shell 25C is illustrated. The cap shell 25C includes a slot 195 positioned on the inner surface of the reservoir receptacle 60C and spaced a distance from the pierce point 190. The outer surface of the reservoir 30C includes tab members 200 as illustrated in FIG. 17. While the construction illustrated herein includes three tabs 200, other constructions may include one continuous or non-continuous tab, or any number of tabs greater than two.

The tabs 200 are sufficiently flexible to deflect as the reservoir 30C is inserted into the receptacle 60C, thereby allowing for the easy installation of the reservoir 30C into the cap shell 35C. The tabs 200 are sized and positioned to fit into the slot 195 at the point where the reservoir 30C is located in its final operating position. In this position, the pierce point 190 has completely pierced the protective layer 185 as shown in broken lines in FIG. 16. Because the slot 195 is continuous, the reservoir 30C can be rotated to sever a portion of the protective layer 185 if desired. In other constructions, the slot 195 is not continuous, thus preventing the rotation of the reservoir 30C within the cap shell 25C.

As described above, the release section 100 of the reservoir 30, 30A, 30C or the one-piece cap 20B is designed to deliver the desired volume of fuel additive at the desired flow rate for the particular application in which it is being used. The desired drip rate is a function of many variables (e.g., fuel additive make-up, engine size, frequency of engine use, type of fuel, venting, etc.). Continuing the chain saw example, a release section 100 that delivers a single drop of additive every three days may provide the desired protection to the chain saw engine. However, a large fuel storage container may require ten or more drops per day to properly treat the fuel.

Different drip rates or flow rates can be achieved by varying the design of the release section 100. For example, a very slow drip rate may be achieved by providing a small aperture 105 and a relatively thick membrane 115 in conjunction, while a fast drip rate may be achieved by providing a delivery mechanism including only a membrane 115. One having ordinary skill in the art will realize that any desired drip rate may be achieved with the present invention.

In preferred constructions, the housings (sometimes referred to herein as cap shell, reservoir, or housing) are made from high-density polyethelene (HDPE), with other materials being possible (e.g., composites, ceramics, metals, etc.). HDPE provides the strength and durability required while remaining easy to manufacture. Other materials, including metals, may be suitable for one or both of the housings. To further enhance the seal provided by the housings, fluorinated HDPE can be used. Fluorinated HDPE provides a vapor barrier that substantially reduces the rate of fuel vapor escape from the container or tank 15.

Many different fuel additives are available that can be dispensed by the invention. In addition, different mixtures of fuel additives can be employed. For example, a mixture of several different compounds including a multifunctional additive, an antioxidant, a corrosion inhibitor, and a metal deactivator may be desirable. One additive package includes a mixture comprising approximately 68% HiTec 4733 Antioxidant as sold by Ethyl Corporation located at 330 South Florida Street Richmond, Va. 23218-2183. The mixture also contains approximately 2% HiTec 4705 Metal Deactivator also sold by Ethyl Corporation. The remainder of the mixture, approximately 30% is made up of Ashland Low Odor Base Solvent #529-66 (Naptha) as sold by Ashland Distributing Company, P.O. Box 2219, Columbus Ohio 43216.

Yet another additive package includes a mixture comprising approximately 57% DMA-54HF, 36% AO-30, 3.5% DCI-6A and 3.5% DMD-2. DMA-54HF, AO-30, DCI-6A, and DMD-2 are trade designations for compounds sold by Octel Starreon, LLC of Littleton Colo. DMA-54HF is a composition of components commonly sold as a multifunctional additive for fuel. AO-30 is a composition of chemicals commonly sold as an antioxidant. DCI-6A is a chemical composition sold as a corrosion inhibitor, while DMD-2 is a chemical composition sold as a metal deactivator.

Other additives deliverable by the invention include solid additives. For example, Vanlube PCX is a solid crystalline anti-oxidant compound sold by R. T. Vanderbilt Company, Inc. of Norwalk Conn.

To deliver a solid fuel additive such as Vanlube PCX, a membrane 115 that absorbs fuel and vapors is used. The splashing within the tank or container combined with normal evaporation within the tank and condensation within the reservoir 85 wet the membrane. The crystals or powder within the reservoir 85 dissolve into the fuel absorbed by the membrane 115 and drip back into the tank. Thus, the apparatus of the invention is capable of delivering additive that is stored as a liquid or a solid.

The apparatus of the invention delivers additive to the fuel whether or not the fuel container is in use. If the fuel container is not used for a long period of time, the additive concentration within the container will increase. The higher concentration of additive enhances the protection provided by the additive during idle times. In addition, the higher concentration provides increased engine protection when the engine, powered by the fuel, is first started following an idle period.

As used herein, the terms fuel tank, fuel container, storage tank, etc. are interchangeable, as the invention will function with any vessel able to contain a fluid. As such, the invention should not be limited to the tanks or containers illustrated herein.

Although the invention has been described in detail with reference to certain preferred embodiments, variations and modifications exist within the scope and spirit of the invention as described and defined in the following claims.

What is claimed is:

1. An apparatus that provides a fuel additive to a fuel, the apparatus comprising:
    a housing defining a fuel additive chamber, the housing having a release section that automatically releases a portion of the fuel additive from said chamber into said fuel,
    wherein the release portion is adapted to release a predetermined portion of the fuel additive at a predetermined time interval.

2. The apparatus of claim 1, wherein the housing further includes a vent opening positioned to admit air into the housing.

3. The apparatus of claim 2, further comprising a semi-permeable membrane, at least partially covering the vent opening, that allows the passage of gas and inhibits the passage of liquids and solids.

4. The apparatus of claim 3, wherein the semi-permeable membrane includes a support layer and a wetting-resistant layer.

5. The apparatus of claim 4, wherein the wetting resistant layer includes a polyethersulfone polymer.

6. The apparatus of claim 3, wherein the semi-permeable membrane includes:
    a first membrane having a first wetting-resistant layer, the first membrane covering the vent opening and oriented such that the first wetting-resistant layer is adjacent the fuel additive chamber; and
    a second membrane having a second wetting-resistant layer, the second membrane covering the first membrane and oriented such that the second wetting-resistant layer faces away from the first membrane.

7. The apparatus of claim 6, wherein the first membrane includes a first support layer, and wherein the second membrane includes a second support layer.

8. The apparatus of claim 6, wherein at least one of the first wetting-resistant layer and the second wetting-resistant layer includes a polyethersulfone polymer.

9. The apparatus of claim 3, further comprising a protective layer at least partially covering the semi-permeable membrane.

10. An apparatus that provides a fuel additive to a fuel, the apparatus comprising:
    a housing defining a fuel additive chamber, the housing having a release section that automatically releases a portion of the fuel additive from said chamber into said fuel,
    wherein the release section dispenses additive at a first rate when exposed to a fuel vapor and a second rate when not exposed to the fuel vapor, the second rate being lower than the first rate.

11. The apparatus of claim 10, wherein the housing further includes a vent opening positioned to admit air into the housing.

12. The apparatus of claim 11, further comprising a semi-permeable membrane, at least partially covering the vent opening, that allows the passage of gas and inhibits the passage of liquids and solids.

13. The apparatus of claim 12, wherein the semi-permeable membrane includes a support layer and a wetting-resistant layer.

14. The apparatus of claim 13, wherein the wetting resistant layer includes a polyethersulfone polymer.

15. The apparatus of claim 12, wherein the semi-permeable membrane includes:
   a first membrane having a first wetting-resistant layer, the first membrane covering the vent opening and oriented such that the first wetting-resistant layer is adjacent the fuel additive chamber; and
   a second membrane having a second wetting-resistant layer, the second membrane covering the first membrane and oriented such that the second wetting-resistant layer faces away from the first membrane.

16. The apparatus of claim 15, wherein the first membrane includes a first support layer, and wherein the second membrane includes a second support layer.

17. The apparatus of claim 15, wherein at least one of the first wetting-resistant layer and the second wetting-resistant layer includes a polyethersulfone polymer.

18. The apparatus of claim 12, further comprising a protective layer at least partially covering the semi-permeable membrane.

19. An apparatus that provides a fuel additive to a fuel, the apparatus comprising:
   a housing defining a fuel additive chamber, the housing having a release section that automatically releases a portion of the fuel additive from said chamber into said fuel; and
   a peelable cover removably attached to the housing and covering the release section, the presence of the peelable cover operable to inhibit the dispensing of additive.

20. The apparatus of claim 19, wherein the housing further includes a vent opening positioned to admit air into the housing.

21. The apparatus of claim 20, further comprising a semi-permeable membrane, at least partially covering the vent opening, that allows the passage of gas and inhibits the passage of liquids and solids.

22. The apparatus of claim 21, wherein the semi-permeable membrane includes a support layer and a wetting-resistant layer.

23. The apparatus of claim 22, the wetting resistant layer includes a polyethersulfone polymer.

24. The apparatus of claim 21, the semi-permeable membrane includes:
   a first membrane having a first wetting-resistant layer, the first membrane covering the vent opening and oriented such that the first wetting-resistant layer is adjacent the fuel additive chamber; and
   a second membrane having a second wetting-resistant layer, the second membrane covering the first membrane and oriented such that the second wetting-resistant layer faces away from the first membrane.

25. The apparatus of claim 24, wherein the first membrane includes a first support layer, and wherein the second membrane includes a second support layer.

26. The apparatus of claim 24, wherein at least one of the first wetting-resistant layer and the second wetting-resistant layer includes a polyethersulfone polymer.

27. The apparatus of claim 21, further comprising a protective layer at least partially covering the semi-permeable membrane.

28. A cap that delivers a fuel additive to a fuel container containing a fuel, the cap comprising:
   a first housing defining a fuel additive chamber, the first housing having a release section that automatically releases a portion of the fuel additive from said chamber; and
   a second housing selectively enagable with the container, the second housing supporting the first housing to position the release portion of the first housing in fluid communication with the container to allow the portion of fuel additive released from the chamber to enter the fuel container,
   wherein the first housing further includes a vent opening positioned to admit air into the first housing.

29. The cap of claim 28, further comprising a semi-permeable membrane at least partially covering the vent opening, wherein the semi-permeable membrane allows the passage of gas and inhibits the passage of liquids and solids.

30. The cap of claim 29, wherein the semi-permeable membrane includes a support layer and a wetting-resistant layer.

31. The cap of claim 30, wherein the wetting-resistant layer includes a polyethersulfone polymer.

32. The cap of claim 29, wherein the semi-permeable membrane includes:
   a first membrane having a first wetting-resistant layer, the first membrane covering the vent opening and oriented such that the first wetting-resistant layer is adjacent the fuel additive chamber; and
   a second membrane having a second wetting-resistant layer, the second membrane covering the first membrane and oriented such that the second wetting-resistant layer faces away from the first membrane.

33. The cap of claim 32, wherein the first membrane includes a first support layer, and wherein the second membrane includes a second support layer.

34. The cap of claim 32, wherein at least one of the first wetting-resistant layer and the second wetting-resistant layer includes a polyethersulfone polymer.

35. The cap of claim 29, further comprising a protective layer at least partially covering the semi-permeable membrane.

36. A cap that delivers a fuel additive to a fuel container containing a fuel, the cap comprising:
   a first housing defining a fuel additive chamber, the first housing having a release section that automatically releases a portion of the fuel additive from said chamber; and
   a second housing selectively engagable with the container, the second housing supporting the first housing to position the release portion of the first housing in fluid communication with the container to allow the portion of fuel additive released from the chamber to enter the fuel container,
   wherein the release section dispenses additive at a first rate when exposed to a fuel vapor and a second rate when not exposed to the fuel vapor, the second rate being lower than the first rate.

37. A cap that delivers a fuel additive to a fuel container containing a fuel, the cap comprising:

a first housing defining a fuel additive chamber, the first housing having a release section that automatically releases a portion of the fuel additive from said chamber; and a second housing selectively engagable with the container, the second housing supporting the first housing to position the release portion of the first housing in fluid communication with the container to allow the portion of fuel additive released from the chamber to enter the fuel container; and a peelable cover removably attached to the first housing and covering the release section, the presence of the peelable cover operable to inhibit the dispensing of additive.

38. A cap comprising:

a fuel additive;

a first housing defining a fuel additive chamber, the fuel additive contained within the fuel additive chamber, the first housing having a release section at automatically releases a portion of the fuel additive from said fuel additive chamber;

a second housing interconnected with the first housing, the second housing supporting the first housing to position the release portion of the first housing to allow the portion of fuel additive released from the chamber to enter the fuel; and a membrane disposed within the release section, the membrane absorbing and releasing fuel additive at a predetermined rate, wherein the housing further includes a vent opening positioned to admit air into the housing.

39. The cap of claim 38, further comprising a semi-permeable membrane at least partially covering the vent opening, wherein the semi-permeable membrane allows the passage of gas and inhibits the passage of liquids and solids.

40. The cap of claim 39, wherein the semi-permeable membrane includes a support layer and a wetting-resistant layer.

41. The cap of claim 40, wherein the wetting resistant layer includes a polyethersulfone polymer.

42. The cap of claim 39, wherein the semi-permeable membrane includes:

a first membrane having a first wetting-resistant layer, the first membrane covering the vent opening and oriented such that the first wetting-resistant layer is adjacent the fuel additive chamber; and a second membrane having a second wetting-resistant layer, the second membrane covering the first membrane and oriented such that the second wetting-resistant layer faces away from the first membrane.

43. The cap of claim 42, wherein the first membrane includes a first support layer, and wherein the second membrane includes a second support layer.

44. The cap of claim 42, wherein at least one of the first wetting-resistant layer and the second wetting-resistant layer includes a polyethersulfone polymer.

45. The cap of claim 39, further comprising a protective layer at least partially covering the semi-permeable membrane.

46. A cap comprising:

a fuel additive;

a first housing defining a fuel additive chamber, the fuel additive contained within the fuel additive chamber, the first housing having a release section that automatically releases a portion of the fuel additive from said fuel additive chamber;

a second housing interconnected with the first housing, the second housing supporting the first housing to position the release portion of the first housing to allow the portion of fuel additive released from the chamber to enter the fuel; and a membrane disposed within the release section, the membrane absorbing and releasing fuel additive at a predetermined rate, wherein the release section dispenses additive at a first rate when exposed to a fuel vapor and a second rate when not exposed to the fuel vapor, the second rate being lower than the first rate.

47. A cap comprising:

a fuel additive;

a first housing defining a fuel additive chamber, the fuel additive contained within the fuel additive chamber the first housing having a release section at automatically releases a portion of the fuel additive from said fuel additive chamber;

a second housing interconnected with the first housing, the second housing supporting the first housing to position the release portion of the first housing to allow the portion of fuel additive released from the chamber to enter the fuel;

a membrane disposed within the release section, the membrane absorbing and releasing fuel additive at a predetermined rate; and a peelable cover removably attached to the first housing and covering the release section, the presence of the peelable cover operable to inhibit the dispensing of additive.

48. A cap comprising:

a fuel additive;

a first housing defining a fuel additive chamber, the fuel additive contained within the fuel additive chamber, the first housing having a vent section and a release section;

a protective layer covering the vent section and establishing substantially air-tight seal; and a second housing adapted to support the first housing in a dispensing position, the second housing including a pierce point positioned to penetrate the protective layer and break the air-tight seal when the first housing is supported in the dispensing position.

49. The cap of claim 48, wherein the vent section includes a vent opening semi-permeable membrane at least partially covering the vent opening, wherein the semi-permeable membrane allows the passage of gasses and inhibits the passage of liquids and solids.

50. The cap of claim 49, wherein the semi-permeable membrane includes a support layer and a wetting-resistant layer.

51. The cap of claim 50, wherein the wetting resistant layer includes a polyethersulfone polymer.

52. The cap of claim 49, wherein the semi-permeable membrane includes:

a first membrane having a first wetting-resistant layer, the first membrane covering the vent opening and oriented such that the first wetting-resistant layer is adjacent the fuel additive chamber; and a second membrane having a second wetting-resistant layer, the second membrane covering the first membrane and oriented such that the second wetting-resistant layer faces away from the first membrane.

53. The cap of claim 52, wherein the first membrane includes a first support layer, and wherein the second membrane includes a second support layer.

54. The cap of claim 52, wherein at least one of the first wetting-resistant layer and the second wetting-resistant layer includes a polyethersulfone polymer.

55. The cap of claim 49, further comprising a protective layer at least partially covering the semi-permeable membrane.

56. The cap of claim 48, wherein one of the first housing and the second housing includes a tab member and the other of the first housing and the second housing includes a recess, the tab engaging the recess to position the second housing in the dispensing position.

57. The apparatus of claim 48, wherein the release section dispenses additive at a first rate when exposed to a fuel vapor and a second rate when not exposed to the fuel vapor, the second rate being lower than the first rate.

58. The apparatus of claim 48, further comprising a peelable cover removably attached to the first housing and covering the release section, the presence of the peelable cover operable to inhibit the dispensing of additive.

59. A fuel additive dispenser comprising:
a housing including a chamber containing a fuel additive, a delivery portion, and a vent opening; and
a first membrane having a first fuel wetting-resistant layer, the first membrane covering the vent opening.

60. The fuel additive dispenser of claim 59, wherein the first membrane is oriented such that the first wetting-resistant layer is adjacent the fuel additive chamber, the dispenser further comprising a second membrane having a second wetting-resistant layer, the second membrane covering the first membrane and oriented such that the second wetting-resistant layer faces away from the first membrane.

61. The fuel additive dispenser of claim 60, wherein the first membrane includes a first support layer, and wherein the second membrane includes a second support layer.

62. The fuel additive dispenser of claim 60, wherein a least one of the first wetting-resistant layer and the second wetting-resistant layer includes a polyethersulfone polymer.

63. The fuel additive dispenser of claim 60, wherein first membrane and the second membrane allow the passage of gasses and inhibit the passage of liquids and solids.

64. The fuel additive dispenser of claim 60, wherein the first membrane completely covers the vent opening and the second membrane completely covers the first membrane.

65. The fuel additive dispenser of claim 60, wherein the first membrane inhibits the escape of fuel additive from the vent opening and the second membrane inhibits the passage of liquids into the fuel additive chamber.

66. The fuel additive dispenser of claim 60, further comprising a protective layer at least partially covering the second membrane.

67. The fuel additive dispenser of claim 66, wherein the protective layer has a protective configuration and a vent configuration, and wherein when arranged in the protective configuration the protective layer covers the second membrane and inhibits the passage of gas through the first membrane and the second membrane, and when arranged in the vent configuration the protective layer allows the passage of gasses through the first membrane and the second membrane.

68. The apparatus of claim 60, wherein the delivery portion automatically dispenses additive at a first rate when exposed to a fuel vapor and a second rate when not exposed to the fuel vapor, the second rate being lower than the first rate.

69. The apparatus of claim 59, further comprising a peelable cover removably attached to the housing and covering the membrane, the presence of the peelable cover operable to inhibit the dispensing of additive.

* * * * *